US007962625B1

(12) United States Patent
Addetia et al.

(10) Patent No.: US 7,962,625 B1
(45) Date of Patent: Jun. 14, 2011

(54) MANAGING DISTRIBUTED FUNCTIONAL MODULES USING STANDARD MANAGEMENT APPLICATIONS

(75) Inventors: Salimah Addetia, Cambridge, MA (US); Rajesh Rajaraman, Waltham, MA (US); Vitaly Revsin, Andover, MA (US)

(73) Assignee: NetApp, Inc., Sunnyvale, CA (US)

( * ) Notice: Subject to any disclaimer, the term of this patent is extended or adjusted under 35 U.S.C. 154(b) by 408 days.

(21) Appl. No.: 12/113,165

(22) Filed: Apr. 30, 2008

(51) Int. Cl.
*G06F 13/00* (2006.01)
(52) U.S. Cl. ........................................ 709/227; 709/223
(58) Field of Classification Search .................. 709/223, 709/227, 228; 711/161, 162, 163
See application file for complete search history.

(56) References Cited

U.S. PATENT DOCUMENTS

| 7,194,538 | B1 * | 3/2007 | Rabe et al. .................... 709/224 |
| 7,254,608 | B2 * | 8/2007 | Yeager et al. ................. 709/203 |
| 7,406,596 | B2 * | 7/2008 | Tararukhina et al. ......... 713/165 |
| 7,506,040 | B1 * | 3/2009 | Rabe et al. .................... 709/223 |
| 2003/0177422 | A1 * | 9/2003 | Tararoukhine et al. ........ 714/48 |
| 2009/0063665 | A1 * | 3/2009 | Bagepalli et al. ............. 709/222 |

* cited by examiner

*Primary Examiner* — Kenneth R Coulter
(74) *Attorney, Agent, or Firm* — Perkins Coie LLP (57) ABSTRACT

A distributed storage server includes a network module, data module and a management module. The management module receives a data user command for execution on the data module. The data user command is forwarded to the data module and any execution output sent back to the management module. Similarly, the data module receives a management user command for execution on the management module. The management user command is forwarded to the management module and any execution output sent back to the data module.

23 Claims, 7 Drawing Sheets

MANAGING DISTRIBUTED FUNCTIONAL MODULES USING STANDARD MANAGEMENT APPLICATIONS

FIELD OF THE INVENTION

At least one embodiment of the present invention pertains to network storage servers, and more particularly, to a technique for managing functional modules in a distributed storage server.

BACKGROUND

A storage server is a special purpose processing system used to store and retrieve data on behalf of one or more clients on a network. A storage server operates on behalf of one or more storage clients to store and manage data in a set of mass storage devices, such as magnetic or optical storage-based disks or tapes. The mass storage devices can be organized into one or more groups of disks (e.g., redundant array of inexpensive disks (RAID)).

Figure 1A:
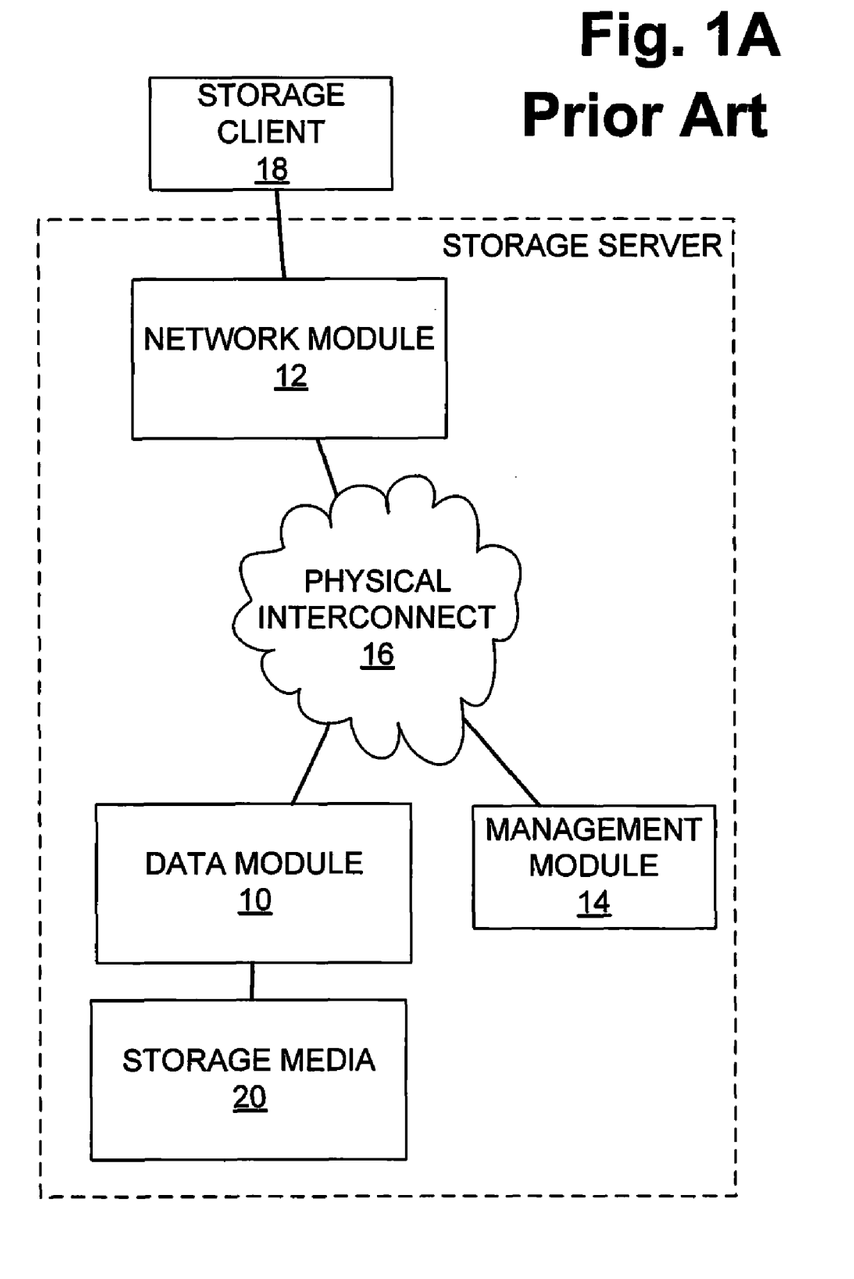
FIG. 1A illustrates a storage server.

A storage server can include multiple modules, as depicted in FIG. 1A. The storage server can include a data module 10, a network module 12, and a management module 14, which communicate with each other over a physical interconnect 16. An "integrated" storage server is a storage server which includes at least the functionality of a network module, the functionality of a data module, and certain management module functionality, in one physical system.

The main purpose of the network module is to provide an interface to a storage client 18 (or multiple storage clients) for purposes of receiving data access requests (e.g., read and write requests) from the storage client 18 and transmitting responses to those requests to this storage client 18. The network module can include functionality for translating between one or more protocols used by the storage client 18 and an internal protocol used by the storage server.

The main purposes of the data module are to provide an interface to storage media 20, to control data layout on the storage media, and to respond to client-initiated read and write requests. The data module can also include other functionality, such as creating a backup, a mirror image or a snapshot of stored data. Functions of the data module, which can include functions not mentioned here, are referred to collectively and individually as "data module functionality".

The main purpose of the management module is to interface with a network administrator to allow the network administrator to control various management and administrative functions of the storage server. Functions of the management module, which can include functions not mentioned here, are referred to collectively and individually as "management module functionality".

A first example integrated storage server includes the above functionality in a single kernel executing on a single system. The first example integrated storage server provides a single command line interface at the data module that receives user commands for execution on the storage server.

A second example integrated storage server includes at least a management module and a data module executing on a single system. The second example integrated storage server provides a command line interface at the management module for receiving user commands for execution on the storage server.

The storage server can alternatively have a distributed architecture. Multiple modules can execute on multiple physical systems, all communicating with each other over a network. Such an architecture allows convenient scaling, such as by adding multiple instances of these modules and new systems when additional storage server capacity is required.

Various problems are associated with a conventional distributed storage server architecture such as this. For example, the management module normally provides the only management/administrative user interface to the storage server. However, in certain instances a network administrator accessing the management module (e.g., from a management client) may want to execute a data user command (i.e., a command for invoking data module functionality) at the distributed storage server. However, a conventional management module does not provide data module functionality, and to modify the management module to provide such data functionality at the management module would require significant design changes to the management module, which can be costly.

In another example, the integrated storage server can be adapted or reconfigured to allow it to be used as part of a distributed storage server as a data module. It may be desirable to do this, for example, in order to prolong the useful life of an integrated storage server when its capabilities are no longer adequate for the current capacity or performance needs of a storage system. For example, it may be desirable to migrate or reconfigure a storage system from an integrated architecture to a larger, more-scalable distributed architecture.

In that regard, at least one known integrated storage server can be reconfigured so that only some of its functionality is used, namely, its data module functionality. Such reconfiguration essentially allows the integrated storage server to be used as a data module in a distributed architecture such as described above.

One problem with this usage model, however, is that an administrator accessing the integrated storage server, now functioning only as a data module, may want to transmit a management user command (i.e., a command for invoking management module functionality) to the integrated storage server. However, the data module does not provide this functionality, and modifying it to do so would require significant design changes, which can be costly.

To summarize, therefore, in a distributed storage server architecture there can be problems enabling a user to access certain functionality from certain modules. In particular, there can be problems enabling a user to access data module functionality when the user only has access to a management module, or allowing a user to access management module functionality when the user only has access to a data module.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

The problems discussed above can be solved by designing a management module of a storage server to forward received data user command to an appropriate data module for execution and by designing a data module of the storage server to forward a received management user command to a management module for execution. The management modules and the data modules can execute on different systems. Thus, it is possible to receive user commands at a first module on a first system for execution on a second module on a second system.

As used herein, the term "data user command" means a user initiated command for invoking data module functionality, while the term "management user command" means a user initiated command for invoking management module functionality. This approach enables users without direct access to particular module on a system (e.g., a management module or a data module) to nonetheless invoke functionality of such a module, without requiring extensive redesign of those modules.

In one embodiment, the management module executes a pre-processing function that determines whether a received user command is a data user command, and if so, forwards the data user command to the data module for execution.

In another embodiment, the management module initiates a connection with the data module, over which the data user command is transmitted. Execution output can be returned to the management module by the data module over the connection. Thus, the management module can receive and process data user commands with minimal changes.

The above solution allows a smooth transition from an integrated storage server to a distributed storage server. As discussed above, an integrated storage server can be reconfigured to function as a data module in a distributed storage server. The existing data module functionality of the integrated storage server is preserved by executing data user commands locally. New management module functionality is supported by the management module executing the management user commands.

If desired, the above solution can reduce the necessity of multiple implementations of functionality on various data modules of the distributed storage server. Instead, common functionality can be implemented at the management modules. This reduces software complexity and development costs.

Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1B:
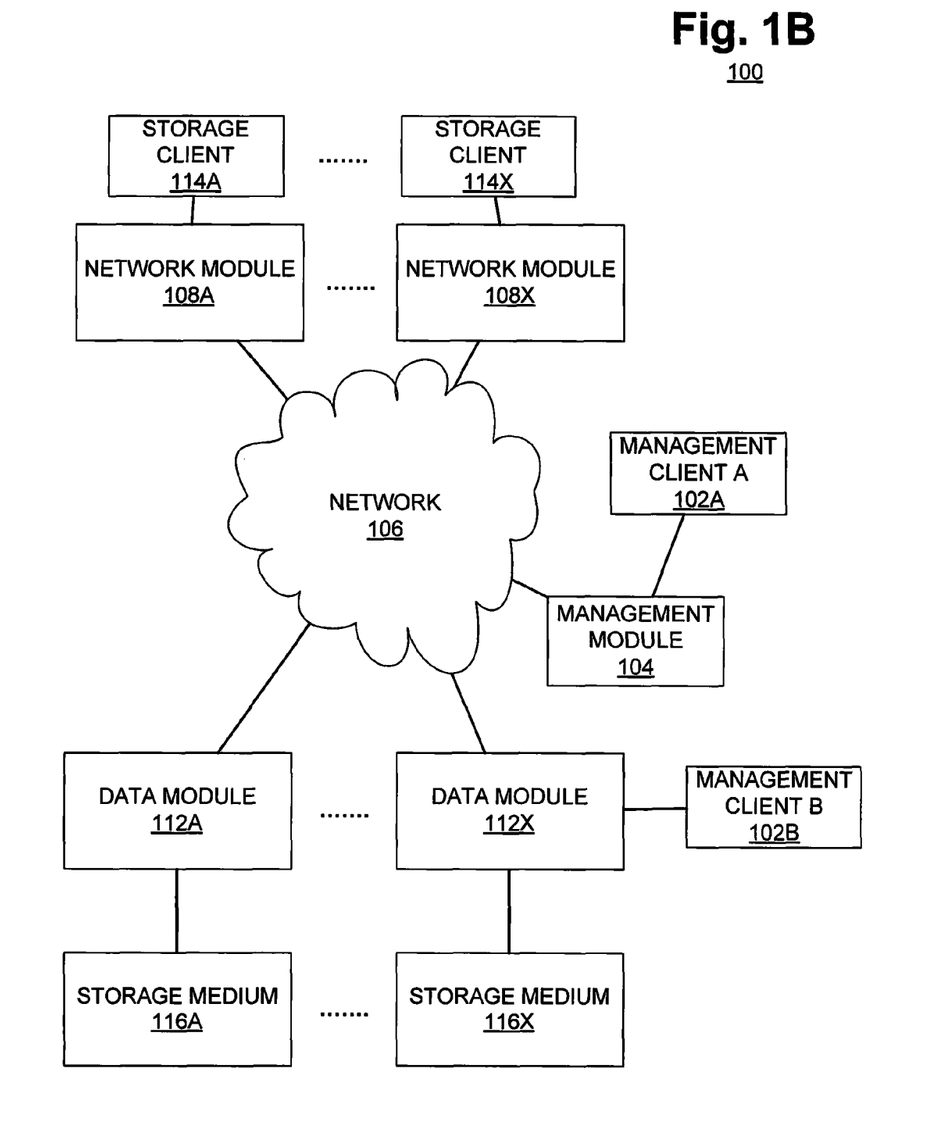
FIG. 1B illustrates a distributed storage system.

FIG. 1B illustrates a distributed storage system 100. The distributed storage system 100 includes a management module 104, network modules 108A to 108X, and data modules 112A to 112X. The modules communicate over a network 106. Storage system may support file-based access requests and/or block-based access requests. It will be appreciated that the modules can execute on one or more different physical systems and all communicate with each other over the network 106.

A management client 102A executes a management application that interfaces with an administrator. The management client 102A also communicates with the management module 104 over a communications medium, such as a local area network (LAN). The management client 102A receives user commands from the administrator. The received user commands can be management user commands or data user commands, discussed below.

The management module 104 manages and administers various functions of the distributed storage system 100, generally in response to management user commands. It will be appreciated that multiple management modules 104 can be installed, each configured to receive user commands from management clients. The management modules can monitor a virtual IP address for incoming management client requests.

Figure 3:
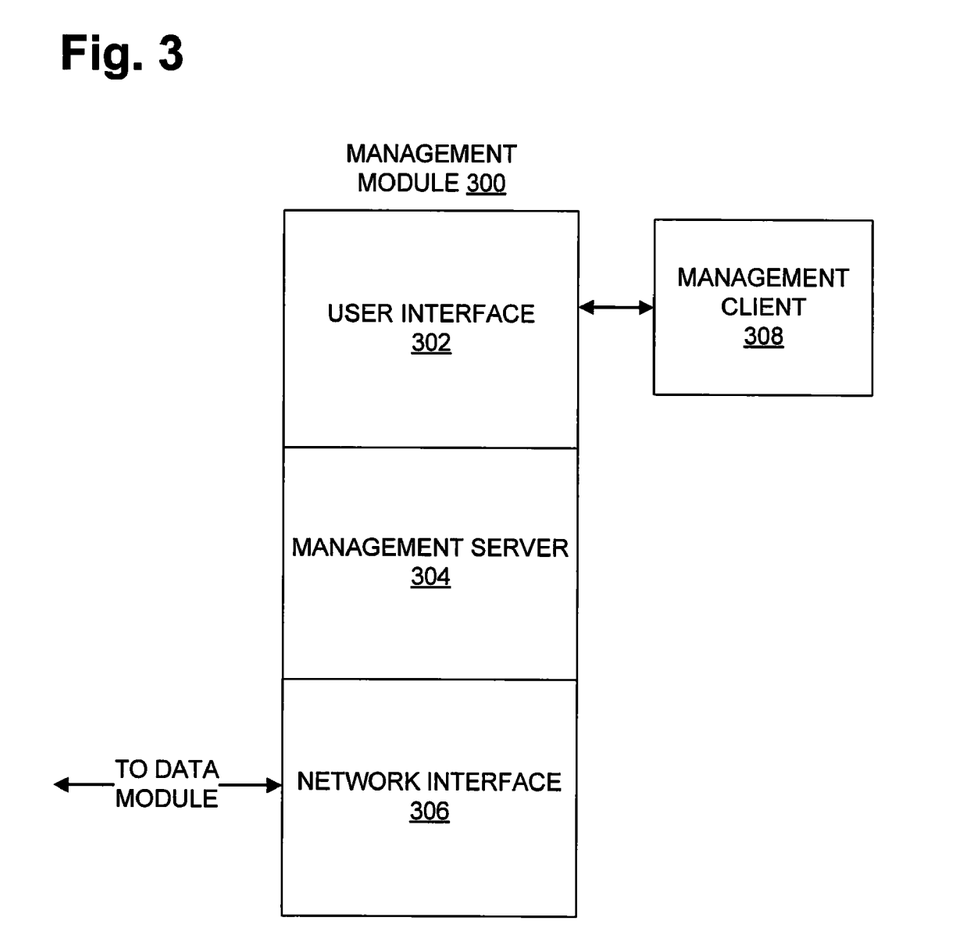
FIG. 3 illustrates an example of a management module of the distributed storage server.

The management module 104 implements management module functionality capable of affecting the distributed storage system 100 and executes management user commands. Management module functionality can include, for example, provisioning storage, installing new software on the distributed storage server or the management module, backing up a volume, scheduling a volume mirroring function, and other functions. The management module 104 includes network interfaces to communicate with management clients and other modules. The management module 104 can be as illustrated in FIG. 3, discussed below.

Network modules 108A to 108X communicate with storage clients 114A to 114X to receive data access requests and respond to those requests. For example, data access requests can be user requests to data modules to read and write data. The network modules 108A to 108X also translate requests into an internal protocol understood by the data modules 112A to 112X (the details of such protocol are not germane to the technique introduced here).

A network 106 carries communications between the management module 104, the network modules 108, and the data modules 112. The network 106 can be a standard Ethernet network or any other network configured to carry digital information.

Figure 2:
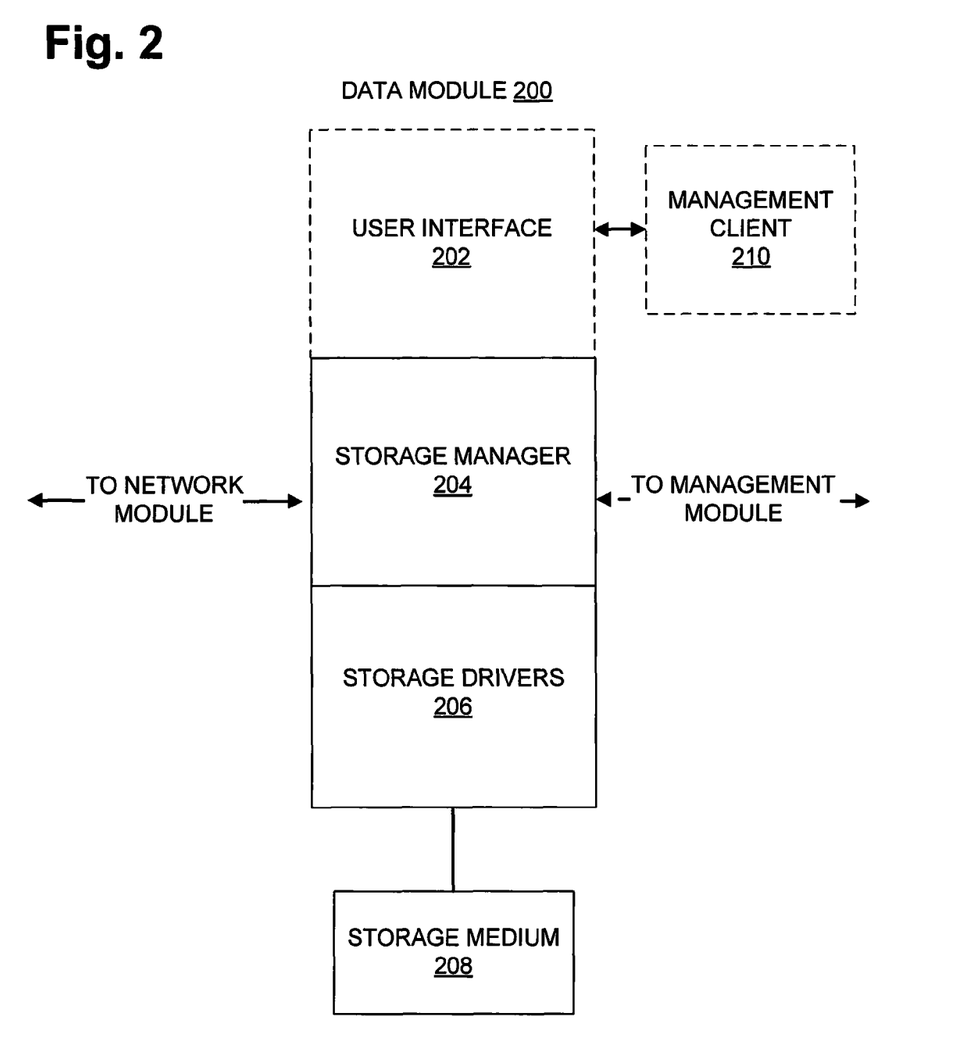
FIG. 2 illustrates an example of a data module of the distributed storage server.

The data modules 112A to 112X implement data module functionality and execute data user commands. For example, data module functionality can include storing data on storage media 116A to 116X, controlling data layout on the storage media, servicing read and write requests, creating a mirror of a storage medium, executing a diagnostic function on one or more storage media, and other functions. Each data module 112 includes one or more accessible storage media 116 which store data. A data module 112 can be as illustrated in FIG. 2, discussed below.

In one possible implementation, the management client A 102A can receive a data user command (i.e., a command directed to functionality in the data module) from the administrator. However, the management module 104 does not implement data module functionality. Therefore, the data user command is forwarded to the appropriate data module for execution, as discussed below.

In one possible implementation, an integrated storage server is reconfigured to function only as a data module 112X within the distributed storage system 100. The data module 112X accepts connections from management clients, such as management client B 102B. Thus, the data module 112X can receive management user commands from management client B 102B, but does not implement any management module functionality. Such management user commands are forwarded to an appropriate management module 104 for execution, as discussed below.

It will be appreciated that any number of network modules, data modules and management modules can be present in the distributed storage system 100. It will be appreciated that any number of distributed storage systems 100 can be networked together to create a larger storage system.

FIG. 2 illustrates an example of a data module 200 of a distributed storage server. The data module 200 is part of a distributed storage server as illustrated in FIG. 1B, discussed above, and is configured to store and retrieve data responsive to client requests and to control data layout on storage media.

The data module 200 includes a storage manager 204. The storage manager 204 services client requests received from a network module to retrieve and store data. The storage manager 204 also controls data layout on a storage medium 208. The storage manager 204 can include a RAID layer that stripes data across multiple hard disks to improve data reliability and access. Other storage techniques to improve data storage can also be implemented in the storage manager 204.

The storage manager 204 implements functionality invoked by data user commands. For example, a mirror function allows a duplicate of stored data to be stored elsewhere. A troubleshooting function allows the data module 200 to access and diagnosis the storage medium 208.

The data module 200 also includes storage drivers 206. The storage drivers 206 handle communication with the underlying physical storage medium. The storage drivers 206 are configured to read and write data from the storage mediums in compliance with one or more file systems, such as Network File System (NFS), Common Internet File System (CIFS), Internet small computer system interface (iSCSI), and Fibre Channel Protocol (FCP) drives.

The data module 200 communicates with a storage medium 208. The storage medium 208 can be or include hard disks, tapes, flash memory, or other accessible memory configured to store data and information. The storage medium 208 can be multiple hard disks arranged as RAID groups.

In one possible implementation, the storage manager 204 receives forwarded data user commands from the management module for execution. As will be discussed below, the management module may receive data user commands, which it does not support and forwards them to the data module 200.

In one possible implementation, an integrated storage server is reconfigured to be a data module 200 of a distributed storage server in the manner discussed above.

As part of an integrated storage server, the data module 200 includes a user interface 202 that communicates with a management client 210. The management client 210 accesses the user interface 202 via standard protocols such as telnet, secure shell (ssh), remote shell (rsh), or any other standard or communication protocol. The user client 210 can be authenticated with standard authentication procedures in accordance with the appropriate protocol. Because the data module 200 does not implement management user commands, any received management user commands are forwarded by the data module 200 to a management module for execution.

In one embodiment, when the data module 200 receives a user command via the user interface 202, the storage manager 204 first determines whether the user command is to be executed at the data module 200 or at a management module. For example, the user command can be compared to a list of management and data user commands to determine where it should be executed. The list can be stored at an accessible location to the data module 200 and contain all management and data user commands supported by the distributed storage system. The list can be updated by system programmers as new functionality and user commands are added to the distributed storage system. If the user command is to be executed remotely, it is forwarded to the management module for execution.

In this embodiment, the user command can be automatically compared and forwarded to management module. This process is configured to be completely transparent, and no further user inputs are required.

In another embodiment, the management client 210 can transmit a special user command to the user interface 202 that initiates a connection from the storage manager 204 to the management module. Subsequent management user commands received by the management client 210 are forwarded to the management module over the connection for execution. Similarly, any management module output is received at the data module 200 from the management module over the connection. The connection can be persistent or temporary.

FIG. 3 illustrates an example of a management module 300 of a distributed storage server. The management module 300 can be a module in a distributed storage server illustrated in FIG. 1B, discussed above. The management module 300 is configured to service management user commands received from an administrator and to control the distributed storage server, including one or more data modules, in response to those commands.

The management module 300 includes a user interface 302. The user interface 302 interacts with an administrator at a management client 308, discussed below, to receive user commands and provide output. For example, the user interface 302 can be a command line interface or a graphical user interface.

The management module 300 also includes a management server 304. The management server 304 includes programming and data structures to perform management module functionality and execute management user commands, including creating and joining clusters, managing the data modules of the storage server, load balancing across the data modules, installing additional software on the distributed storage server, scheduling backups, provisioning storage, and/or other functions.

The management module 300 also includes a network interface 306. The network interface 306 interfaces between the management module 300 and a network, allowing the management module 300 to communicate with one or more data modules and network modules over a network. The network interface 306 supports standard communication protocols such as telnet, ssh, rsh, or other protocols. The network interface 306 communicates over a network, such as an Ethernet network.

The management module 300 communicates with a management client 308 via the user interface 302. The management client 308 is configured to communicate with an administrator and can be a client software application or other module.

The management client 308 communicates with the management module 300 over a network. This allows the distributed storage server to be administrated and controlled remotely. The management client 308 receives user commands for execution on the distributed storage server from an administrator.

Some user commands are management user commands to be executed at the management module 300. Other user commands are data user commands to be executed at the data module, such as mirroring a storage medium, running a disk diagnostic, license management, data services management, storage medium setup, and other functionality.

In one embodiment, the user interface 302 in the management module 300 executes a pre-processing function that determines whether a received user command is to be executed at the management module 300 or an appropriate data module. For example, the user command can be compared to a list of management and data user commands to determine where it will be executed. The list can be stored at an accessible location to the management module 300 and contain all management and data user commands supported by the distributed storage system. The list can be updated by system programmers as new functionality and user commands are added to the distributed storage system. If the user command is to be executed remotely, it is forwarded to the data module by the network interface 306. The management server 304 can determine an appropriate data module by looking up a list of accessible data modules within the distributed storage server. The management server can update and maintain the list of accessible data modules as new data modules are installed in the distributed storage server and old data modules are removed.

In another embodiment, the administrator can specify where the user command is to be executed. For example, the user command can be inputted with administrator-set parameters defining which data module will execute the user command.

In another embodiment, the administrator can enter a special user command that initiates a connection from the management module 300 to the data module. Subsequent data user commands are forwarded to the data module for execution over the connection.

In one embodiment, the connection is an interactive command line interface similar to a telnet session. User commands are forwarded to an appropriate data module. Any response or output from the data module is displayed to the user at the management module 300. An execution result or a prompt for additional parameters is displayed. For example, the interactive command line interface can be supported by a persistent connection.

In another embodiment, the connection is a non-interactive command line interface. A user command is received and forwarded to the data module for execution. The user commands are sent to a special port of the data module, where a shell daemon listens for such commands. Any output is sent back to the management module 300 over another connection. For example, the non-interactive command line interface can be supported by a non-persistent connection.

Figure 4:
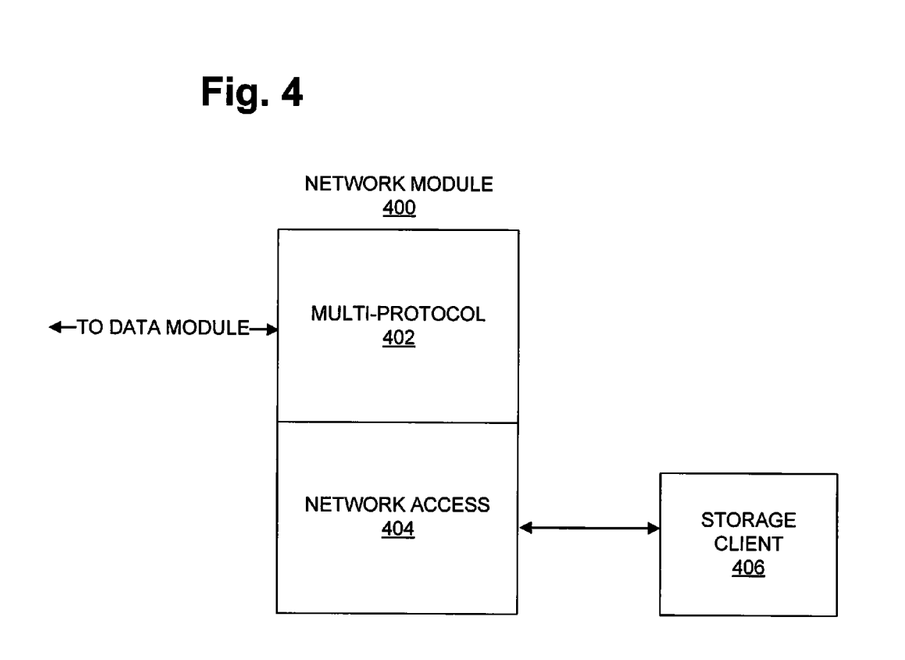
FIG. 4 illustrates an example of a network module of the distributed storage server.

FIG. 4 illustrates an example of a network module 400 of the distributed storage server. The network module 400 allows a data module to communicate over a network with a storage client 406.

The network module 400 includes a multi-protocol layer 402 and a network access layer 404. The multi-protocol 402 layer implements various higher-level network protocols, such as Network File System (NFS), Common Internet File System (CIFS), Hypertext Transfer Protocol (HTTP) and/or Internet small computer system interface (iSCSI). The network access layer 404 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

The network module 400 communicates with the data module via the multi-protocol 402 layer using a protocol which the data module can understand (the details of which are not germane to the techniques introduced here). The network module 400 communicates with the storage client 406 via the network access 404 layer. The storage client 406 can be an application or client with data requests for the distributed storage server. The network module 400 forwards client requests to the data module.

Figure 5:
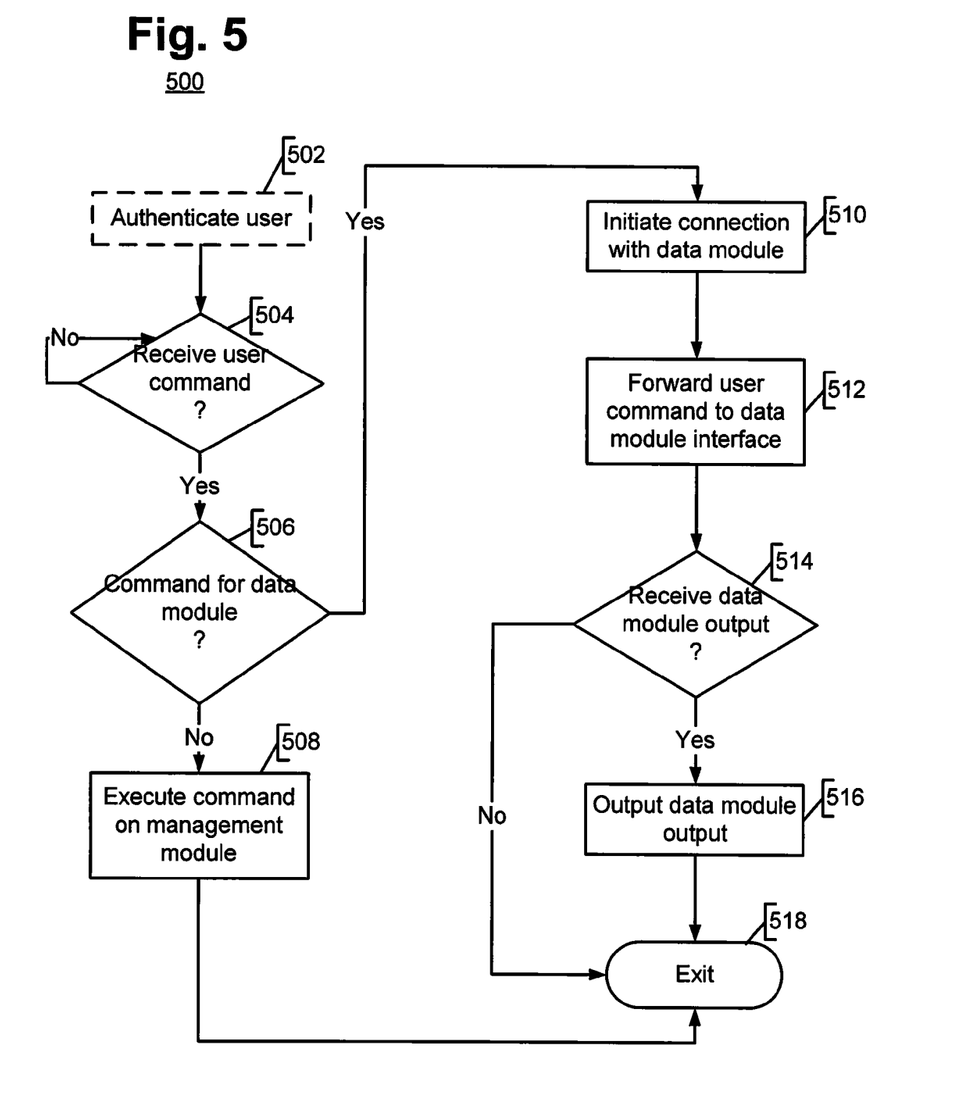
FIG. 5 illustrates a procedure for providing a user interface to the data module.

FIG. 5 illustrates a procedure 500 for providing a remote user interface to the data module. The procedure executes on a management module such as illustrated above and allows data user commands to be forwarded from the management module to the data module for execution.

In 502, the management module optionally authenticates a user. The management module provides a user interface to the user, such as a storage server administrator. The user interface can first require the user to log in and authenticate with a correct username and password. The authentication procedures are predefined by a communication protocol.

In 504, the management module determines whether a user command has been received. The user can input a user command into the user interface provided by the management module for execution by the distributed storage server. As described above, the command can be, for example, a command for executing storage medium mirroring, a command for a executing storage medium management function, a command for updating license information, or a command for executing a disk diagnostic function.

If a user command is received, the procedure proceeds to 506. If no user command is received, the procedure waits at 504 until a user command is received.

In 506, the management module determines whether the received user command is to be executed on the data module. Data user commands are executed on the data module and management user commands are executed on the management module, as discussed above. The management module may look up a list of management user commands and data user commands to determine where the received user command is to be executed.

If the user command is a data user command, the procedure proceeds to 510. If the user command is a management user command, the procedure proceeds to 508.

In 508, the management module executes the management user command locally. Example management user commands include software install, time management, DNS management, cluster management, and other similar functions affecting the distributed storage server. Such commands are most efficiently implemented and executed at the management module.

In 510, the management module initiates a connection with the data module. The connection is made with a standard communications protocol over a network, such as telnet, ssh, rsh, or other protocols. The connection can be persistent or temporary.

In one embodiment, a persistent connection is used for data user commands that require further user inputs, such as additional parameters. A persistent connection is also used to send back any execution output from the data module.

In another embodiment, a temporary connection is used to send the data user command. Either no data module output is required or a second connection will be established to send the data module output back to the management module. This is more efficient if the user command produces no output, or produces output after a long delay. Thus, it would be beneficial to conserve network resources and not maintain a persistent connection to wait for the output.

In 512, the management module forwards the data user command to the data module. The data user command is encrypted or otherwise secured in accordance with a communication protocol, such as telnet, ssh, rsh, or other protocols. Because the user has been authenticated by the management module (if required), no further authentication is required by the data module before executing the data user command.

In 514, the management module determines whether a data module output has been received. The data module can produce an output responsive to executing the user command, such as a success message, an error message, or a request for additional parameters.

If data module output is received, the procedure proceeds to 516. If no data module output is received, the procedure proceeds to 518.

In 516, the management module displays the data module output. For example, a diagnostic produces storage medium information. A mirroring command produces a confirmation message that the mirror has successfully been created.

In 518, the management module exits the procedure.

In an alternative embodiment, the management module provides a special command that initiates a connection to the data module. Once the connection is established, subsequent user commands are forwarded to the data module for execution. Any data module output can be returned to the management module over the connection.

A similar procedure can execute at a data module to forward management user commands from a data module to a management module to provide a remote user interface to the management module. As discussed above, this may be useful when an integrated storage server reconfigured to operate only as a data module receives management user commands from a user interface. Such commands are forwarded to a management module for execution in accordance with the techniques introduced here. As described above, such commands can include, for example, a command for executing a software install on the management module, a command for creating a cluster storage server, and a command for joining a cluster storage server.

Figure 6:
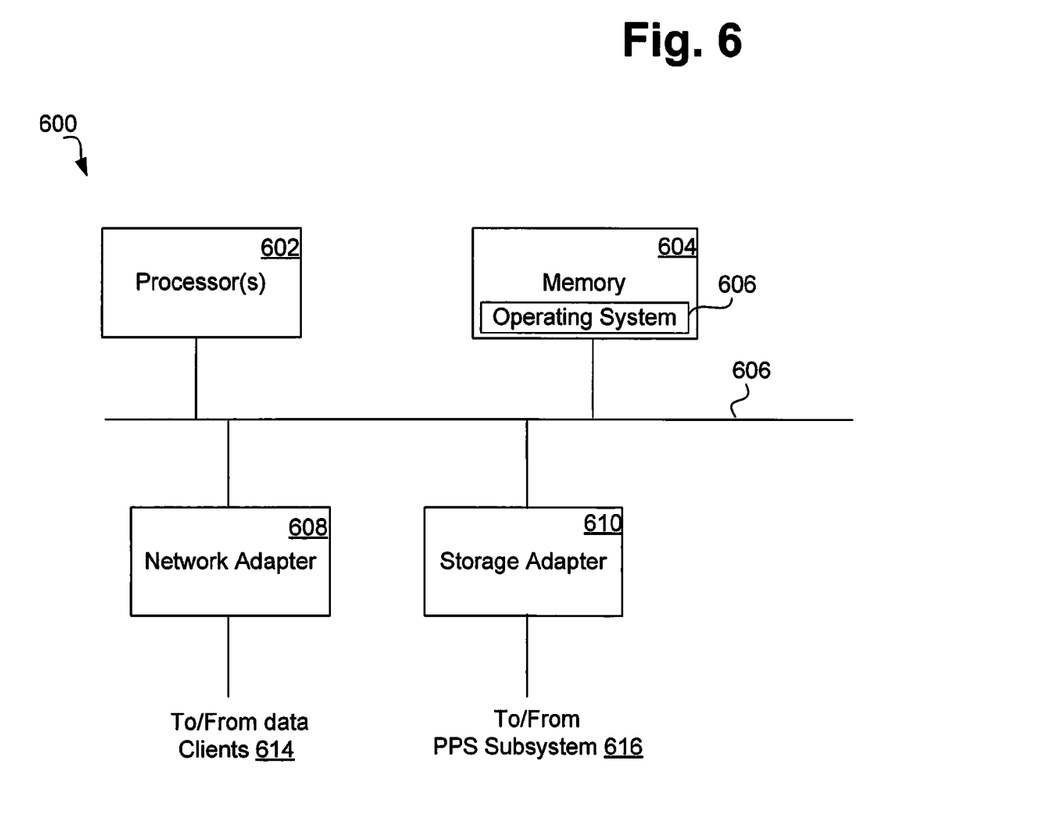
FIG. 6 is a high-level block diagram showing an example of the physical architecture of a processing system that can implement any one or more of a network module, a data module, or a management module.

FIG. 6 is a high-level block diagram showing an example of the physical architecture of a processing system 600 that can implement any one or more of a network module, a data module, or a management module. The processing system 600 includes one or more processors 602 and memory 604 coupled to an interconnect 606. The interconnect 606 shown in FIG. 6 is an abstraction that represents any one or more separate physical buses, point to point connections, or both connected by appropriate bridges, adapters, or controllers. The interconnect 606, therefore, can include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 602 can include central processing units (CPUs) of the processing system 600 and, thus, control the overall operation of the processing system 600. In certain embodiments, the processor(s) 602 accomplish this by executing software or firmware stored in memory 604. The processor(s) 602 can be, or can include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 604 is or includes the main memory of the processing system 600. The memory 604 represents any form of random access memory (RAM), read-only memory (ROM), flash memory (as discussed above), or the like, or a combination of such devices. In use, the memory 604 can contain, among other things, software embodying a data module, a management module, and or a network module.

Also connected to the processor(s) 602 through the interconnect 606 are a network adapter 608 and a storage adapter 610. The network adapter 608 provides the processing system 600 with the ability to communicate with remote devices, such as storage clients 614, over the interconnect 606 and can be, for example, an Ethernet adapter or Fibre Channel adapter. The storage adapter 610 allows the processing system 600 to access the PPS subsystem 616 and can be, for example, a Fibre Channel adapter or a SCSI adapter.

The techniques introduced above can be implemented in special-purpose hardwired circuitry, in software and/or firmware in conjunction with programmable circuitry, or in a combination thereof. Special-purpose hardwired circuitry can be in the form of, for example, one or more application-specific integrated circuits (ASICs), programmable logic devices (PLDs), field-programmable gate arrays (FPGAs), etc.

Software or firmware to implement the techniques introduced here can be stored on a machine-readable medium and can be executed by one or more general-purpose or special-purpose programmable microprocessors. A "machine-readable medium", as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
  receiving a user command at a first module executing on a first system of a distributed storage server, wherein the distributed storage server includes a data module and a management module, the first module is the data module or the management module, the data module is in communication with at least one storage medium and the management module administers the distributed storage server;
  determining if the user command is to be executed at a second module executing on a second system, wherein the second module is the one of the data module and the management module which is not the first module;
  initiating a connection between the first module and the second module; and
  in response to a determination that the user command is to be executed at the second module, forwarding the user command from the first module to the second module for execution at the second module.

2. The method of claim 1, further comprising:
  responsive to the second module executing the user command, the first module receiving an output over the connection.

3. The method of claim 1, further comprising:
  authenticating a user before receiving the user command at the first module.

4. The method of claim 3, wherein the connection between the first module and the second module is persistent.

5. The method of claim 1, wherein the connection between the first module and the second module is a rsh, a telnet, or a ssh connection.

6. The method of claim 1, wherein the connection between the first module and the second module is over a private network.

7. The method of claim 1, wherein the storage medium includes a hard disk and the data module includes disk drivers for accessing the hard disk.

8. The method of claim 1, wherein
the user command for execution on the data module is at least one of: executing a storage medium mirroring, a storage medium management function, updating a license information, or executing a disk diagnostic function, and
the user command for execution on the management module is at least one of: executing a software install on the management module, creating a cluster storage server, or joining a cluster storage server.

9. A method for executing user commands in a distributed storage server for storing data, comprising:
receiving a user command at a data module executing on a first system, the user command for execution at a management module executing on a second system, wherein the data module is in communication with at least one storage medium and the management module administers the distributed storage server;
automatically selecting a management module for executing the user command;
initiating a connection between the data module to the management module; and
transmitting the user command from the data module to the management module for execution at the management module.

10. The method of claim 9, further comprising:
receiving an execution output at the data module from the management module responsive to the management module executing the user command.

11. A distributed storage server for storing data, comprising:
a first system configured to execute a first data module of the distributed storage server, the first data module operable to communicate with a storage medium of the distributed storage server; and
a second system configured to execute a management module of the distributed storage server, the second system in communication with a network, the management module configured to administer the distributed storage server and to
responsive to a prompt to the user, receive a user command, the user command for execution at the first data module,
initiate a connection between the management module and the first data module over the network, and
forward the user command to the first data module over the connection.

12. The system of claim 11, wherein the management module is further configured to
responsive to the first data module executing the user command, receiving a first data module output.

13. The system of claim 11, wherein the network is an Ethernet network.

14. The system of claim 11, further comprising:
a second data module, wherein the management module administrates a data cluster including the first data module and the second data module.

15. The system of claim 11, wherein the management module is associated with a virtual IP address, wherein management clients transmit user commands to the virtual IP address.

16. A non-transitory computer-readable medium including instructions adapted to execute a method for executing user commands in a distributed storage server for storing data, the method comprising:
receiving a user command at a data module executing on a first system, the user command for execution at a management module executing on a second system, wherein the data module is in communication with at least one storage medium and the management module administers the distributed storage server;
initiating a connection between the data module and the management module; and
transmitting the user command to the management module for execution.

17. The non-transitory computer-readable medium of claim 16, the method further comprising:
receiving an execution output from the management module responsive to the management module executing the user command.

18. The non-transitory computer-readable medium of claim 16, wherein the user command is at least one of: executing a software install on the management module, creating a cluster storage server, or joining a cluster storage server.

19. A distributed storage server for storing data, comprising:
a first system configured to execute a data module of the distributed storage server, the data module operable to communicate with a storage medium of the distributed storage server; and
a second system configured to execute a management module of the distributed storage server, the second system in communication with a network, the management module operable to administer the distributed storage server;
the data module further operable to
receive a user command, the user command for execution at the management module,
initiate a connection between the management module and the data module over the network, and
forward the user command to the management module over the connection.

20. The distributed storage server of claim 19, wherein the connection between the management module and the data module is persistent.

21. The distributed storage server of claim 19, wherein the connection between the management module and the data module is a rsh, a telnet, or a ssh connection.

22. The distributed storage server of claim 19, wherein the connection between the management module and the data module is over a private network.

23. The distributed storage server of claim 19, wherein the user command is a command to cause at least one of: executing a software install on the management module, creating a cluster storage server, or joining a cluster storage server.

* * * * *